W. J. WRIGHT.
PISTON PACKING.
APPLICATION FILED MAR. 12, 1913.
1,097,069.
Patented May 19, 1914.
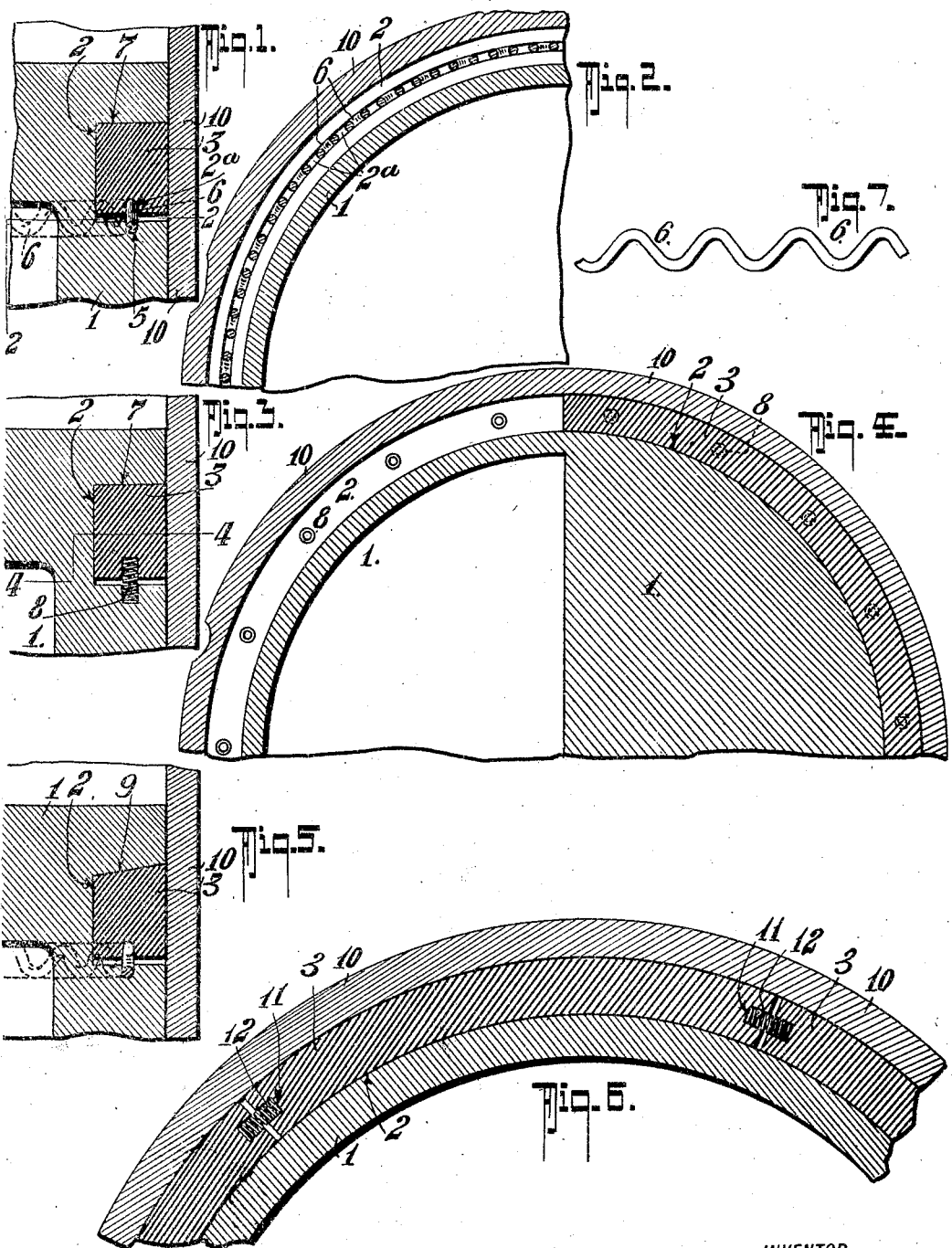
WITNESSES:
John F. Schrott
H. Woodard
INVENTOR
William J. Wright
BY
Fred G. Dieterich & Co.
ATTORNEYS.

UNITED STATES PATENT OFFICE.

WILLIAM JAMES WRIGHT, OF FRANKLIN, PENNSYLVANIA.

PISTON-PACKING.

1,097,069.  Specification of Letters Patent.  Patented May 19, 1914.

Application filed March 12, 1913. Serial No. 753,790.

*To all whom it may concern:*

Be it known that I, WILLIAM J. WRIGHT, residing at Franklin, in the county of Venango and State of Pennsylvania, have invented certain new and useful Improvements in Piston-Packing, of which the following is a specification.

My invention relates to certain new and useful improvements in packing rings for pistons, and it has for its object to provide a packing ring construction which is particularly adaptable for use with high pressure internal combustion engines.

I have found that in many instances the ordinary packing rings commonly employed will be jammed against the cylinder walls so tightly as to cause undue wear and soon render the rings useless as well as unduly increasing the clearance between the piston and cylinder walls. This objectionable action is caused by leaking of the gases which, when the piston is operating under the force of explosion, will hold the packing ring down tight against the bottom of the groove and by leaking in between the ring and the piston side, the ring is caused to expand under the full pressure of the exploded mixture and thereby exert undue friction on the cylinder wall.

As will be well understood by those skilled in the art, packing rings are always of a less height than that of the piston groove, therefore on the up stroke of the piston, the ring will tend to seat on the bottom of the piston groove and on the down stroke of the piston, the ring is supposed to (and will usually when but low pressures arise in the working chamber) seat against the upper surface of the groove wall. When, however, high pressures are generated in the engine, the ring does not always seat on the upper wall of the groove as it should, and hence the objectionable action of the leaking gases.

It is, therefore, the primary object of my invention to overcome these objectionable features. This, I accomplish by providing means for continuously tending to hold the packing ring up against the upper wall of the piston groove and also, if desired, provide means for tending to expand or spread the ring to hold it in contact with the cylinder wall.

More subordinately, the invention includes those novel details of construction, combination and arrangement of parts, all of which will be first fully described and then be specifically pointed out in the appended claims, reference being had to the accompanying drawing, in which:—

Figure 1 is a detail section showing one form of the invention. Fig. 2 is a cross section on the line 2 2 of Fig. 1. Fig. 3 is a detail section showing a modification of the invention. Fig. 4 is a horizontal section on the line 4—4 of Fig. 3. Fig. 5 is a detail section of a further modification. Fig. 6 is a cross section on the line 6—6 of Fig. 5. Fig. 7 is a detail view of the zigzag spring which is employed in the form shown in Fig. 1.

In the drawing, 1 designates the piston and 10 the cylinder, the piston having the usual annular ring groove 2 which is usually of rectangular cross section, with the upper wall 7 of the same paralleling the head of the piston.

3 designates the piston ring which may be of the usual construction save that when used in connection with my invention, the ring 3 is provided with a groove 2 on its underside to register with a corresponding groove 5 in the lower wall of the piston groove, between which grooves 4 and 5, a spring 6 is seated, the spring 6 may be a zigzag wire bent into a ring shape to fit into the groove 2, Instead of employing the spring 6 and grooves 4 and 5, coil springs 8 may be used, in which event, the ring 3 and piston 1 are provided with sockets as shown in Fig. 3 to receive such springs. Instead of making the upper walls 7 of the groove extend at right angles to the side wall 2 and parallel with the piston head, the same may be beveled outwardly as shown in Fig. 5 so that the spring, in forcing the ring 3 upwardly, also tends to effect an expanding movement or spreading of the ring 3 toward the wall of the cylinder 10.

In employing my invention, instead of using the ordinary type of split ring, a ring may be employed formed of several sections and in which event, the abutting ends of the ring sections may be recessed at 11 (see Fig. 6) and provided with spreading coil springs 12 to tend to expand or spread the ring.

In operation, the springs 6 or 8, as the case may be, are so designed as to hold the ring 3 in the positions shown in Figs 1, 3 and 5 during the compression stroke of the piston instead of letting the rings lag back to the bottom of the groove, thus escape of gases pass the piston head between the rings 3 and the upper surface 7 or 9 of the groove 2 is avoided and hence there is little or no danger of the gases under pressure working back between the rings 3 and the side wall of the groove 2 and exerting undue tendency toward the spreading of the ring.

From the foregoing description, taken in connection with the accompanying drawing, it is thought the complete construction, operation and advantages of the invention will be apparent to those skilled in the art to which the same appertains.

What I claim is:—

1. In combination with the piston having a ring groove, of a split ring held in said groove, the width of said ring being less than the width of the groove, said ring and said piston having opposing spring pockets, and a spring mounted in and protected by said pockets to continuously tend to force said ring into contact with the opposite wall of the piston groove.

2. In combination with a piston having an annular piston groove, one face of which is beveled outwardly, of an annular split piston ring mounted in said groove, the width of said ring being less than the width of the groove, said ring and said piston having contacting faces, the opposing contacting faces opposite the beveled faces being normal to the axis of the piston, and said piston and said ring each having an annular spring groove adjacent said normal faces, and a zigzag spring in said grooves.

WILLIAM JAMES WRIGHT.

Witnesses:
 ROBERT N. SPEER,
 D. U. ALBER.